United States Patent [19]

Crane et al.

[11] 3,988,698

[45] Oct. 26, 1976

[54] PLASMA TUBE AND METHOD OF MANUFACTURE

[75] Inventors: Dale E. Crane, Sunnyvale; Robert E. Jones, San Jose; Hector A. Meneses, Los Altos Hills, all of Calif.

[73] Assignee: Spectra-Physics, Inc., Mountain View, Calif.

[22] Filed: Feb. 18, 1976

[21] Appl. No.: 659,083

Related U.S. Application Data

[63] Continuation of Ser. No. 548,034, Feb. 7, 1975, abandoned.

[52] U.S. Cl. ............................................ 331/94.5 D
[51] Int. Cl.² ............................................ H01S 3/03
[58] Field of Search ................................. 331/94.5

[56] References Cited
UNITED STATES PATENTS

| | | |
|---|---|---|
| 3,500,234 | 3/1970 | Goedertier ..................... 331/94.5 D |
| 3,826,998 | 7/1974 | Kindl et al. ..................... 331/94.5 D |

Primary Examiner—William L. Sikes
Attorney, Agent, or Firm—Flehr, Hohbach, Test, Albritton & Herbert

[57] ABSTRACT

Plasma tube for gas lasers including an elongate cylindrical glass envelope closed at one end with a conductive metal anode disc and at the other with a metal cathode disc, each of which has been intimately fused with the envelope. The envelope carries an internally mounted capillary having a bore for confining a discharge within the tube, the capillary being supported by a flange member connected between the capillary and the envelope. Each disc has a centrally located aperture which is aligned with the capillary bore, each aperture being closed by a suitable reflector for defining an optical cavity. Fine tuning of the cavity is accomplished by incremental deformation of one or both of the discs.

12 Claims, 6 Drawing Figures

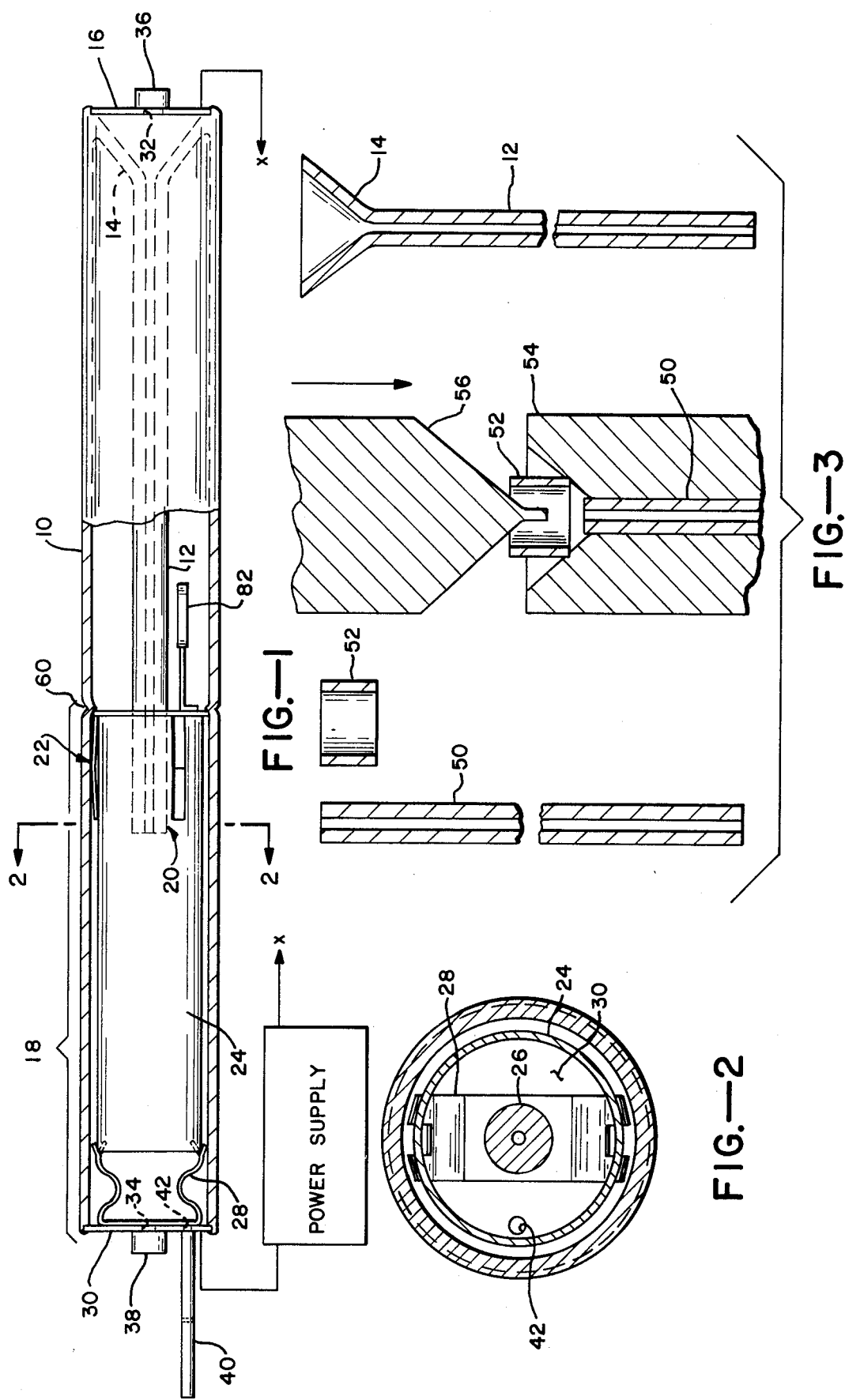

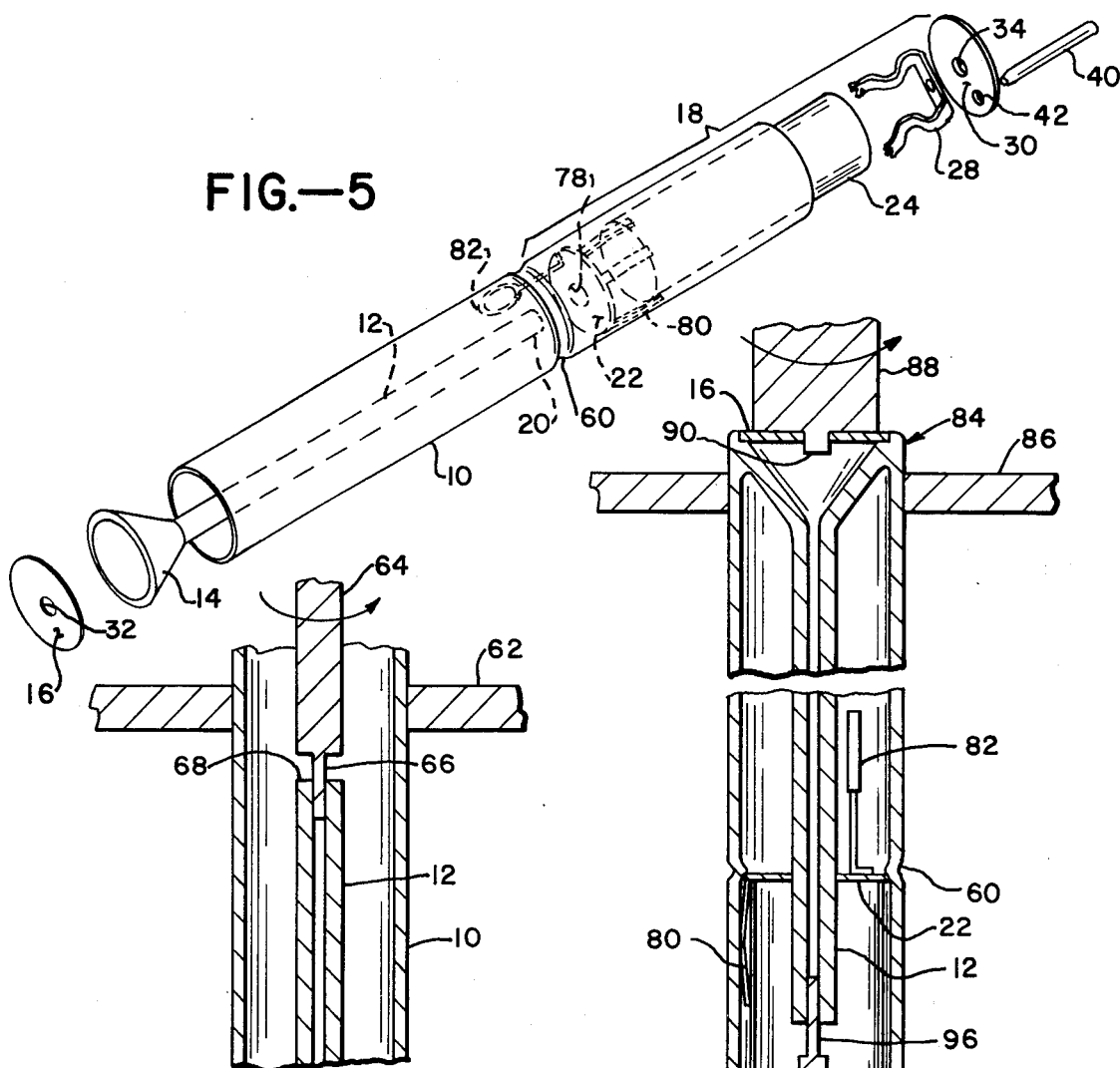
FIG.—5
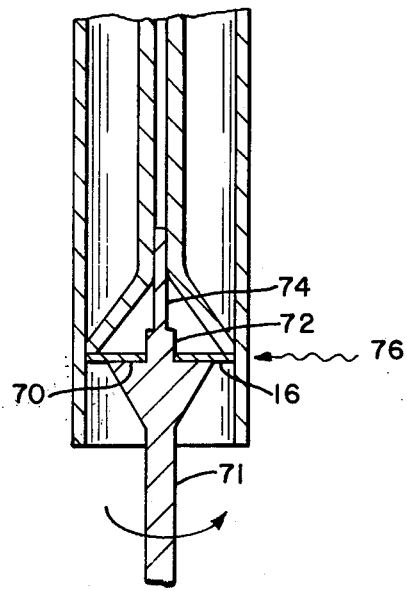
FIG.—4
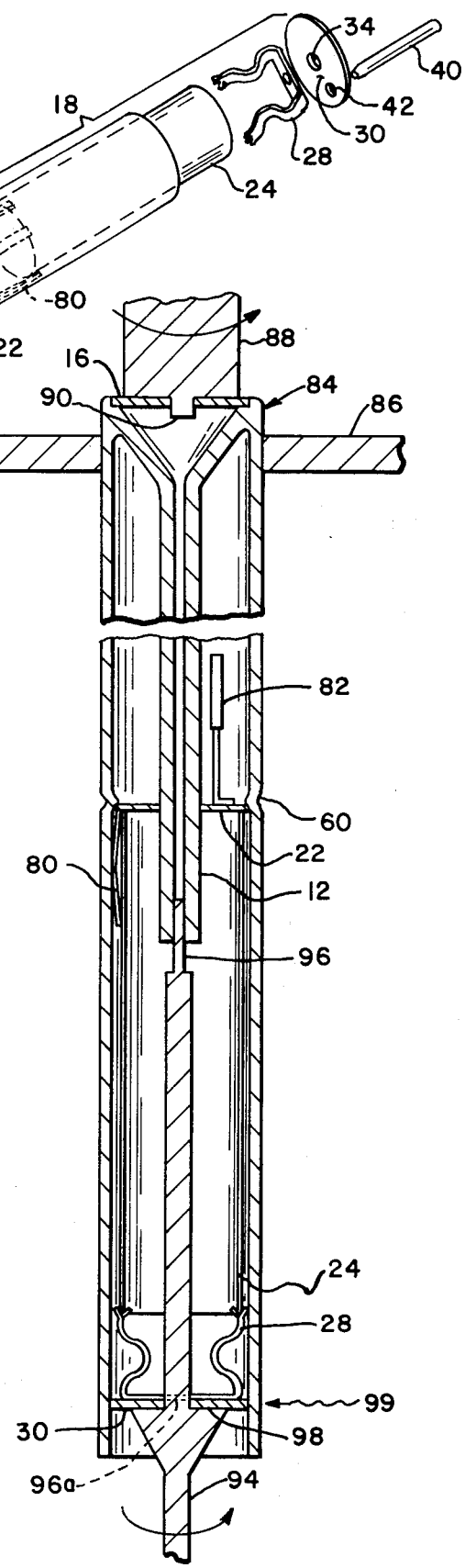
FIG.—6

PLASMA TUBE AND METHOD OF MANUFACTURE

This is a continuation, of application Ser. No. 548,034, filed Feb. 7, 1975 now abandoned.

BACKGROUND OF THE INVENTION

This invention relates to plasma tubes and to methods for their manufacture and more particularly to a reliable, low cost plasma tube particularly suitable for use in manufacturing helium-neon electron-excited gas lasers.

In the past it has been common to build envelopes and associated components for helium-neon gas lasers of a borosilicate glass, such as Corning brand Pyrex 7740 or 7052 glass, widely used for laboratory glassware. Such glass has good thermal properties in that it is resistant to thermal shock, has good thermal conductivity, and also has a low coefficient of thermal expansion. However, it is also known that there are few, if any, metals to which borosilicate glasses can be joined without the use of some sort of graded seal or Housekeeper seal. Accordingly, envelopes for gas lasers have generally required the use of expensive glass forming or molding techniques in order to establish the envelope configuration. The required metallic conductor parts have generally consisted of small-wire tungsten seals through a graded seal in 7740 or Kovar metal seals in 7052 borosilicate glass because of the limitations of glass/metal seal technology. Accordingly, prior tubes have usually been made of all glass structural parts, including seals, tip-offs, and the like, through which special non-structural conductive elements must pass in order to establish an electrical discharge. There is, therefore, a need for an improved gas envelope structure plasma tube and method of manufacture which will overcome the foregoing limitations.

SUMMARY OF THE INVENTION AND OBJECTS

In general, it is an object of the present invention to provide a plasma tube and manufacturing method for use in gas lasers which will overcome the foregoing limitations and disadvantages.

It is a further object of the invention to provide a plasma tube structure which is simple to assemble, reliable and which uses readily available, low cost materials.

Another object of the invention is to provide a plasma tube and manufacturing method, particularly for gas lasers, which can be constructed with a small number of manufacturing steps without the use of conventional glass lathes or other expensive forming procedures.

Another object of the invention is to provide a plasma tube and method by which the same can be readily and easily tuned for maximum laser power output.

The foregoing objects are achieved in the present invention by employing the following manufacturing technique and materials. First, a laser capillary having a flange is joined to an outer envelope, as for example, near one end to establish a discharge path, the end being closed by a metal disc anode. The capillary, the outer envelope and the metal disc are all selected from readily available materials which have closely matched thermal properties so that an excellent metal-to-glass seal is obtained. The next step involves inserting a cathode assembly into the outer envelope from the outer end, to which is electrically joined a metal cathode disc having the same thermal properties as the anode. The outer envelope is then fused to the metal cathode disc to thereby define the gas envelope structure, except for end optical elements such as mirrors. In one preferred procedure the fusion of the anode and cathode discs to the outer envelope is accomplished through the known technique of "drop sealing" in which the parts are jigged together with the outer envelope extending below the anode or cathode during each sealing operation. The outer envelope is then heated until it shrinks slightly and fuses into an intimate bond with the respective anode or cathode end disc. The excess outer envelope material drops free under gravity and away from the plasma tube structure during the sealing process.

As preferred materials, the invention calls for the use of potash soda lead glass, available under the trade designations 0120 from Corning or KG12 from Kimble, together with a nickel-chrome-iron alloy (42% Ni, 5–6% chrome, balance Fe) commercially available under the designation Sylvannia No. 4. Less preferred combinations substitute soda lime glass, such as Corning's designation 0080, the more expensive lead silicate glass such as Corning's 0010, and No. 52 nickel alloy (52% Ni, balance Fe) for the respective glass or metal constituent.

The resultant structure is characterized by an elongate, cylindrical glass envelope having a capillary bore carried therein and fused together with the other envelope. A metal anode disc and a metal cathode disc is carried at the respective ends of the structure, the cathode disc being interconnected by suitable means to a cathode carried within the outer envelope at that end.

The entire structure can be readily tuned to maximum output by a technique particularly adapted to the present configuration. The envelope is bent slightly about several radials to its axis until a maxim power output is measured. When a maxim is noted, the bending is released and at least one end disc is inelastically deformed at a very small angular increment to the axis of the capillary by indenting the respective end disc on the maximum radial with a punch as often as necessary to re-establish maximum output.

These and other objects and features of the invention will become apparent from the following description and claims when taken with the accompanying drawings, of which:

BRIEF DESCRIPTION OF THE DRAWINGS

FIG. 1 is a longitudinal view, partly in section, of a gas laser plasma tube constructed in accordance with the present invention;

FIG. 2 is a cross-sectional view of the plasma tube of FIG. 1 taken along the lines 2—2 thereof;

FIG. 3 is a diagrammatic view in cross-section showing the formation of the capillary assembly of the present invention;

FIG. 4 is a diagrammatic view in cross-section showing the capillary, outer envelope, and anode of the plasma tube of FIG. 1 ready for sealing;

FIG. 5 is a perspective, exploded view of the plasma tube of FIG. 1, emphasizing the parts of the cathode assembly; and FIG. 6 is a diagrammatic view in cross-section showing the plasma tube of FIG. 1 including capillary cathode assembly and outer envelope ready for sealing.

DETAILED DESCRIPTION OF THE PREFERRED EMBODIMENTS

Referring now to FIG. 1, a plasma tube constructed in accordance with the present invention is shown in detail and consists generally of an outer envelope 10 having integrally fused therewith a capillary 12 extending coaxially within the tube along a portion of the distance of the outer envelope 10. In general, plasma tubes are constructed in cylindrical geometry for convenience and ease of availability of the basic glassware configurations of which they are made. A flange 14 is formed on the capillary and serves to interconnect the same with the outer envelope. As shown, the flange is preferably located at one end of the outer envelope and capillary tube and is in the shape of a funnel or flared structure and is sealed to envelope 10 to effectively prevent any electron discharge path from existing through the structure other than through the capillary itself. Although the capillary flange is shown as fused at one end, and at an end of the envelope the flange may be located at other positions, as for example, at some intermediate position. An anode 16 is fused to the end of the capillary flared portion and the wall of the outer envelope.

A cathode assembly 18 is positioned in the other end of the outer envelope and extends inwardly into a slightly overlapping relationship with the free end 20 of the capillary. The cathode assembly 18 includes a spider-like member 22 at its free end which positions a hollow aluminum, cylindrical cathode 24 symmetrically in a radial sense within the tube and also supports the cantilevered end 20 of the capillary against movement if the plasma tube becomes subjected to large vibration or other inertial forces. The other end of the cathode assembly terminates in a spring positioning clip 28 which is fused and electrically connected to a cathode end disc 30 under mechanical pressure or brazing, the latter being fused into the respective end of the outer envelope 10. In a typical appliction as, for example, in constructing a helium-neon laser, each of the disc members is provided with a respective one of axially aligned apertures 32, 34. Each of the apertures 32, 34 is closed by one of reflective mirror or partially transmitting mirror 36, 38 which are sealed to the disc with suitable permanent adhesives, such as epoxy cement or fused to the respective disc with glass frit.

The principal length of the cathode assembly which extends within the tube consists of a cylindrical aluminum sleeve 24 and serves, for example, in a cold cathode configuration for excitation of the gas discharge within the plasma tube by dischare of electrons therefrom to the anode.

Each of the end discs is coined as by stamping to provide a region surrounding the aperture having a predetermined radius of curvature. In one application, such a radius of curvature was approximately 8 inches, centered on the axis of the capillary and externally of the tube, and permits the alignment of the end mirrors, if such be used, to a very fine degree by mere shifting of the end mirror within the socket formed in the coined disc. After alignment, the end mirrors 36, 38 are sealed in place as hereinbefore explained. A small diameter piece of metal tubing 40 is fused by being brazed into a second aperture 42 formed in the cathode end disc to permit evacuation and gaseous filling of the plasma tube.

As previously partially explained, the present invention permits the use of readily available low cost glasses for use in manufacture of laser plasma tubes. The principal glasses believed to be most suitable include Corning 0120 (Kimble KG12) or equivalent having a coefficient of expansion of $90 \times 10^{-7}/°C$. This glass is thermally matched to Sylvannia No. 4 nickel-chrome-iron alloy having a composition of 42% nickel, 6% chrome and 52% iron, also sold under the trade designations Sealmet HC-4 and Carpenter 42-6. Pretreatment by wet hydrogen firing is used to obtain greening of this alloy which permits good fusion between the glass and a surface coating of chromium oxide formed on the alloy. The aforementioned No. 4 nickel-chrome-iron has a coefficient of expansion of $82 \times 10^{-7}/°C$.

The foregoing materials are preferred for use herein in view of their compatability, stability, low cost, and ready availability. However, substitutions can be made, such as Corning 0080 (Kimble R-6) having a coefficient of expansion of $93 \times 10^{-7}/°C$. Use of 0080 or equivalent may be limited, however, due to shortening of tube life of operation as leaching of sodium from this glass cause cause plasma oscillation, the effect of which increases with time. Alternate metals include No. 52 nickel alloy (52% Ni, balance Fe) and platinum. Use of platinum is obviously prohibitively expensive.

The following glass-metal combinations are also found to be suitable, but involve substantial increase in costs. They are Corning 7052, having a coefficient of expansion of $51 \times 10^{-7}/°C$, Corning 7720 or Nonex, having a coefficient of expansion of $35 \times 10^{-7}/°C$, which are sufficiently close to Kovar, having a coefficient of expansion of $48 \times 10^{-7}/°C$ and tungsten, having a coefficient of expansion of $44 \times 10^{-7}/°C$, respectively, to be useful. As previously stated, Corning 7740 (Pyrex) has no matching metal.

While the foregoing glasses and matching metals normally would be selected on the basic of cost as a principal consideration, there are also factos having to do with the use of frit or solder sealing glasses which are contemplated for use in the future production of so-called hard seals in plasma tubes in which the end mirrors are sealed by a glass-to-metal seal, as set forth herein, to thereby eliminate one main source of tube failure; that is, eventual permeability to water vapor existing in current epoxy sealed designs. For such designs, suitable frit or solder glass must be available which will match the glass-metal combinations selected. Examples of such frit or solder sealing glasses are SG-67 ($83 \times 10^{-7}/°C$) and CV-101 ($94 \times 10^{-7}/°C$), both of which have good chemical stability. SG-67 appears preferable due to low weight loss characteristic in the presence of water vapor (0.4 mg/in$^2$ at 120° C) compared to CV-101 (11 mg/in$^2$ at 120° C). These frit or solder sealing glasses are suitable for use with either 0120 (KG-12) or 0080 (R-6) glasses.

Referring now to the FIGS. 3 through 6, the procedure for constructing the plasma tube in the present invention will now be described in detail.

Referring more particularly to FIG. 3, there is shown a preshrunk precision bore capillary tube 50 of the type used generally in the manufacture of such tubes, only made of one of the specified glasses set forth herein. Another short section 52 of similar glass tubing is positioned upon a mold 54 which is then heated and compressed by a die 56 to seal the short section of tubing into a flared flange 14 resembling a cup sealed to the end of capillary tube 50. In this way, the subassembly of capillary 12 is completed.

The outer jacket or envelope 10 of the plasma tube is a length of similar glass, somewhat longer than the ultimate design length of the tube to be formed. Preliminarily, a small depression 60 is formed into the glass tubing by known means and thereby forms a circumferential shoulder therein which will subsequently serve as a cathode assembly stop. The jacket is interior dimension with respect to the outer radius of the flange on the capillary so that there is a slight distance between them.

The anode end plate 16, appropriately selected and treated to match the glasses, is then assembled together with the outer jacket 10 and the capillary in a vertical rotating jig. The jig consists of an upper chuck 62 and spindle 64 having a downwardly projecting tip 66 which precisely locates the free end 68 of the capillary in midposition within the envelope 10. The anode 16 rests on a shoulder 70 of a lower spindle 71 and is raised up within the tube into contact with the flange lower portion of the capillary. Lateral positioning of the lower end of the capillary and of the anode is made by second and third projections 72, 74 which extend upwardly from the lower spindle. The entire unit is then rotated and gradually heated by flame at 76 to the point where the outer tube shrinks slightly, fusing itself into intimate sealing contact with the periphery of both the anode and the flared portion of the capillary resulting in the seal as shown in FIG. 1.

FIG. 5 illustrates the cathode assembly 18. The cathode end disc is fused by spot welding to compression spring clip 28 which electrically contacts the electron emitting element 24 of the cathode which usually comprises a section of aluminum tubing. The other end of the cathode is inserted into the capillary and cathode support member 22 having centrally opening fingers 78 and, radially spaced therefrom, a set of outwardly and axially extending spring clip fingers 80. A getter 82 is spot welded to the support member 22. The cathode assembly is then inserted with the capillary/cathode support member end first into the open end of the partially manufactured plasma tube until the cathode support contacts the previously formed shoulder 60 within the tube. The entire unit is then rejigged, as shown in FIG. 6, the previously formed end 84 of the tubing being held in chuck 86 upwardly and positioned by a spindle 88 having a downwardly projecting tip 90 extending through the aperture 32 in the anode disc. The cathode disc 30 rests on a shoulder 98 formed on the upstanding spindle 94 and located at a predetermined location defining the desired length of the finished plasma tube and also serving to slightly compress spring clip 28. When top and bottom spindles are aligned very accurately, the stem portion above dotted lines 96A is not needed and can be removed. The unit is then flame heated at 99 until the outer envelope shrinks into sealing contact and fuses with the cathode disc. The resulting plasma tube is shown in FIG. 1 after the end mirror members 36, 38 have been applied.

The structure and procedure for assembly of the plasma tube as set forth herein possesses many advantages and overcomes limitations inherent in prior art designs. Each of the end plates, i.e. discs, are easily fabricated from a commonly available alloy, as by stamping and coining the same by well-known operations. When incorporated into the present invention, they provide a fused hard seal to each end of a substantially straight, cylindrical envelope which is also commonly available. The stamped or dished ends provide a mirror seat to which a mirror is sealed either by epoxy cements or by glass frit and suitable firing. Thus, each of the end discs serves several purposes in a single, exceedingly simple structure: the purpose of mirror adjustment; the purpose of sealing the end of the tube in a hard seal; and the purpose of providing electrical contact directly through each end of the tube. In addition, the pinch-off tube can also be made of metal devices which eliminate the usual types of different pinch-off tubulation normally made of glass. It is an obvious advantage in the present structure that the pinch-off tubulation is sealed to the tube by a simple brazing operation which is structurally very mechanical and strong. After the tube has been evacuated and filled satisfactorily, the seal off operation can consist of merely utilizing a pinch-off tool to disconnect the unit from the filling station. This eliminates the rather cumbersome heat sealing and annealing of glass tubulation which had previously been required.

While there has been set forth one preferred form of the invention, it should be understood that other structures should be included within the general understanding of what is taught as within the scope of the present invention. By way of further example to alternatives already presented, there has been shown herein a technique of drop sealing which is reaidly adaptable to certain types of laser glass tube forming equipment. Also, the end discs are shown as sealed by the drop sealing technique by slight contractions and edge envelopment of the outer seal within its own diameter. Many variations will occur to those skilled in the art. For example, the end plates could be butt-sealed in which the disc overlaps the ends of the envelope, either by flame heat, induction heating or baking when utilizing a frit interposed between the end disc and the envelope. In any case, the general procedure calls for direct contact between the end of the glass envelope and the disc, after which heat is applied to the point of flowing of the glass or of the frit. Frits suitable for such purposes can be selected to have a high melting point, more specifically, to have a melting point above or approximately in the range of the softening temperature of the glass itself. In the general selection of materials herein, the discs themselves and the corresponding glasses have been selected so that the metal of which the discs are made has a thermal coefficient of expansion sufficiently close to that of the corresponding glass to be within progressible stress limits for differential expansion when cooled to ambient from the annealing point temperature of the glass to thereby permit formation and retention of a direct glass-to-metal seal between these parts. After filling, pinch-off and preferably the further fine tuning of the plasma tube, as will hereinafter be described, the same as connected by suitable conductors to a power supply as shown diagrammatically in FIG. 1.

While the foregoing structure presents itself as a substantial improvement for the reasons set forth and while it is satisfactory with respect to adjustment of the end mirrors by usual means utilizing the coined spherical recesses in each end disc, it would be desirable to provide for fine tuning of the structure to assure that each unit achieves a maximum potential output. The following has been found to provide an elegant and extraordinarily cheap method of custom tuning each tube to maximum output at exceedingly low cost and effort. The method proceeds by placing the laser tube structure in a jig arrangement in which each end is clamped in place. The middle of the tube is then elastically deformed slightly off axis while the tube is rotated in position to a plurality of angular positions. This can be accomplished by having the entire clamping structure provided with rotatable means or by unclamping and reclamping the plasma tube at successive angular positions with respect to the axis of its length. During this process the power output of the tube is measured and it will readily be found that certain radial direction of bending about its axis results in an improvement in the performance. At this juncture, the amount of bending can be varied to note the maximum power available from the tube which should correspond with tubes of known design and character. This establishes a radial direction in which either the tube itself, as in the testing procedure, or the end plate could be changed, i.e., permanently moved in angular direction, so that the new angular direction, as for example, of the orientation of the mirror surface might be varied permanently a small increment to enhance the power. It is found that the end plates as disclosed herein can be inelastically deformed to tilt the mirror supported thereon in that radial direction by impinging upon the same with a punch to cause a small indentation and resulting deformation in the end plate on that radial direction where improvement has been noted by test. Since this test also establishes the maximum power output available from a given laser, such punch operation can be continued successively until a maximum power output is achieved. In practice, the foregoing has been accomplished with a commonly available spring-loaded center punch, as for example a Starrett No. 18A automatic adjustable stroke center punch.

To those skilled in the art to which this invention pertains, many modifications and adaptations thereof will occur, many of which have been set forth as alternatives herein. Accordingly, the descriptions and examples given herein should be taken as representing the preferred form thereof presently known. However, other adaptations, modifications and substitutions therefor which would be expected of a person skilled in this art should be taken as included within the scope of this invention.

What is claimed is:

1. In a plasma tube structure for use in gas lasers of a type including an outer glass envelope within which is disposed a glass capillary having a discharge path defining bore therethrough by the application of an electric current from a suitable power supply, the improvement comprising a conductive metal anode disc having a lateral extent comparable to that of said envelope, said disc and said envelope being fused together at one end of said envelope, a radially extending flange member interconnecting and fused between said capillary and said envelope to support said capillary such that said flange closes all discharge paths between said one end and the remote end of said capillary except through said bore, said capillary, envelope, and flange member being made of a glass having a predetermined coefficient of expansion, a cathode assembly disposed in communication with that side of said envelope away from said anode and beyond said flange, a cathode conductive disc having a lateral extent comparable to that of said envelope, said disc being fused to said envelope at the end remote from said anode disc, said discs being made of metal having a thermal coefficient of expansion sufficiently close to that of said glass to be within permissible stress limits for differential expansion when cooled to ambient from the annealing point temperature of said glass to permit formation and retention of a direct glass-to-metal seal therebetween, each of said capillary and envelope being circularly cylindrical and coaxial with respect to each other and each of said discs having an aperture therein aligned with the bore of said capillary members disposed at each respective aperture for closing the plasma tube in gas-tight relation, means for forming an optical cavity within said plasma tube and through the capillary bore thereof, said power supply delivering a discharge forming electric field across said anode disc and said cathode disc, and means forming a conductive connection between said cathode assembly and said cathode disc.

2. A plasma tube structure as in claim 1 in which said glasses are selected from 0120 or equivalent and 00080 or equivalent and said metal of said anode and cathode discs are composed is selected from No. 4 nickel-chrome-iron alloy (42% Ni, 6% chrome, 52% Fe) or No. 52 nickel-iron alloy (52% Ni, 48% Fe) or platinum.

3. A plasma tube structure as in claim 1 in which said glass is selected from 7052 or equivalent, 7720 or equivalent and Nonex and in which said metal is selected from tungsten or Kovar (29% Ni, 17% Co, 54% Fe).

4. A plasma tube as in claim 1 in which said cathode assembly includes an elongate aluminum cathode tube serving as a cold cathode, said capillary projecting a short distance within one end of said cathode tube from the anode side thereof, said anode facing end of said tube being interconnected with a radially extending spider-like support having axial finger in radial spring contact between the envelope and the tube to thereby support the same, and central aperture having axial fingers in yielding contact with said capillary to support the same.

5. A plasma tube structure as in claim 4 in which said envelope has an inward projection for limiting movement of said cathode assembly in the direction of said anode, and further including a compression member for conductively interconnecting said cathode disc to said cathode assembly.

6. In the manufacture of plasma tubes for use in gas lasers of a type including an outer glass envelope within which is disposed a glass capillary having a discharge path defining bore therethrough, and including a conductive metal anode disc having a lateral extent comparable to that of said envelope, said disc and said envelope being fused together at one end of said envelope, a radially extending flange member interconnecting and fused between said capillary and said envelope such that said flange closes all discharge paths between said one end and the remote end of said capillary except through said bore, a cathode assembly disposed in communication with that side of said envelope away from said anode and beyond said flange including a cathode conductive disc having a lateral extent comparable to that of said envelope, said disc being fused to said envelope at the end remote from said anode disc, said anode and cathode discs being made of metal having a thermal coefficient of expansion sufficiently close to that of said glass to be within permissible stress limits for differential expansion when cooled to ambient from the annealing point temperature of said glass to permit formation and retention of a direct glass-to-metal seal therebetween, each of said capillary and envelope being cylindrical and coaxial with respect to each other, the method comprising the steps of assembling said outer envelope, anode disc and capillary in a predetermined relationship, applying a source of heat to said outer envelope to elevate the same and capillary flange to the working temperature to thereby fuse said capillary flange, anode disc and envelope into sealing engagement, inserting said cathode assembly into the other end of said outer envelope so as to position said cathode end disc in a predetermined position, applying heat circumferentially to said outer envelope to elevate the same to the working temperature to thereby fuse said cathode disc and said outer envelope into sealing engagement, said steps being carried out in any order including simultaneously.

7. The method as in claim 6 in which said heat is applied to said anode and cathode discs and the respective ends of said envelope by open-flame heating.

8. A method of fine tuning a plasma tube for maximum power output, such plasma tube being constructed with an elongate tubular envelope closed at each end with a deformable disc member mounting mirror optical elements, the steps of operating said plasma tube while measuring the output power therefrom simultaneously bending said plasma tube envelope with respect to its elongate axis such that said axis is formed into a curve bending toward and away from the original axis thereof about a radial from said axis, repeating said steps at a plurality of radial positions, noting the radial direction about the axis where a maximum power output is obtained, inelastically deforming at least one said end disc to tilt the supported mirror thereon in said radial direction.

9. The method as in claim 8 further including the steps of continuing said inelastic deformation until maximum power output is achieved.

10. The method as in claim 8 in which said inelastic deforming step consists of applying a slight deformation with a punch on a radial in one said end disc.

11. In a laser, an outer glass envelope having openings at opposite ends of the same, means formed of glass disposed within said envelope and having therein a capillary passage extending axially of said openings, first and second metallic members disposed in said openings at opposite ends of said envelope, means forming glass-to-metal seals between said envelope and said metallic members to form gas tight connections between said envelope and said metallic members, said metallic members and said glass envelope having similar coefficients of expansion so that the envelope can be heated and cooled without adversely affecting the glass-to-metal seals, said first and second metallic members having apertures therein in alignment with the capillary passage, a power supply, means for connecting said power supply to said metallic member so that one of said metallic members serves as a cathode and the other serves as an anode, and means forming a gas plasma in said envelope.

12. In a plasma tube structure for use in gas lasers of a type including an outer glass envelope within which is disposed a glass capillary having a bore defining a discharge path (defining bore) therethrough by the application of an electron current from a suitable power supply, glass means joining said capillary and said envelope at one end thereof so that the sole path for electron discharge to said one end is through said capillary, a conductive metal anode member for joining to said one end and having a lateral extent comparable to the opening at said one end, said anode member and said envelope being fused together thereat, said capillary, envelope and joining means being made of a glass having a predetermined coefficient of expansion, a cathode assembly disposed in communication with that side of said envelope away from said anode member and beyond said flange, a conductive metal cathode member for closing said end, said cathode member being fused to said envelope at the said end remote from said anode member, said anode and cathode members being made of metal having a thermal coefficient of expansion sufficiently close to that of said glass to be within permissible stress limits for differential expansion when cooled to ambient from the annealing point temperature of said glass to thereby permit formation and retention of a direct glass-to-metal seal therebetween, each of said anode and cathode members having an aperture therein substantially aligned with the bore of said capillary, optical members disposed at each respective aperture for closing the plasma tube in gas tight relation, means for forming an optical cavity within said plasma tube and through said capillary bore thereof, means forming a conductive connection between said cathode assembly and said cathode member, and a power supply for delivering a discharge forming electric field forming potential to said anode and said cathode members.

* * * * *